(12) United States Patent
Bramley et al.

(10) Patent No.: US 8,003,151 B2
(45) Date of Patent: Aug. 23, 2011

(54) LOW FAT FROZEN CONFECTIONERY PRODUCT

(75) Inventors: Allan Sidney Bramley, Shambrook (GB); Sarah Jane Gray, Shambrook (GB); Susan Margaret Turan, Shambrook (GB); Daryl Dwayne Spors, Green Bay, WI (US); Sonja Marie Frisch, Green Bay, WI (US)

(73) Assignee: Conopco, Inc., Englewood Cliffs, NJ (US)

( * ) Notice: Subject to any disclaimer, the term of this patent is extended or adjusted under 35 U.S.C. 154(b) by 577 days.

(21) Appl. No.: 11/447,509

(22) Filed: Jun. 1, 2006

(65) Prior Publication Data

US 2007/0014908 A1    Jan. 18, 2007

Related U.S. Application Data

(60) Provisional application No. 60/699,127, filed on Jul. 14, 2005.

(51) Int. Cl.
*A23G 9/00*     (2006.01)

(52) U.S. Cl. .......................................... 426/565; 426/101
(58) Field of Classification Search ...................... None
See application file for complete search history.

(56) References Cited

U.S. PATENT DOCUMENTS

| | | | |
|---|---|---|---|
| 2003/0134025 A1 * | 7/2003 | Vaghela et al. | ............... 426/565 |
| 2005/0123666 A1 | 6/2005 | Vaghela et al. | |

FOREIGN PATENT DOCUMENTS

| | | |
|---|---|---|
| WO | 98/04148 | 2/1998 |
| WO | 98/04699 | 2/1998 |
| WO | 99/37673 | 7/1999 |
| WO | 00/53029 | 9/2000 |
| WO | 01/06865 | 2/2001 |
| WO | 01/83534 | 11/2001 |
| WO | 2005/060763 | 7/2005 |
| WO | 2005/112656 | 12/2005 |
| WO | 2005/115164 | 12/2005 |

* cited by examiner

*Primary Examiner* — Keith D Hendricks
*Assistant Examiner* — Elizabeth Gwartney
(74) *Attorney, Agent, or Firm* — Gerard J. McGowan, Jr.

(57) ABSTRACT

A low fat frozen confectionery product is provided having 5 wt % or less fat which product comprises a combination of an ice structuring protein (ISP) and a polyol ester of a fatty acid.

22 Claims, No Drawings

LOW FAT FROZEN CONFECTIONERY PRODUCT

This application claims priority under 35 U.S.C. §119 from Provisional Application Ser. No. 60/699,127 filed Jul. 14, 2005.

FIELD OF THE INVENTION

The present invention relates to low fat frozen confectionery products which contain ice structuring proteins and polyol esters of fatty acids.

BACKGROUND TO THE INVENTION

Since the beginning of the 1980s there has been an increasing demand for frozen confectionery products and desserts such as ice cream and related products which have a reduced calorific value.

Reducing the amount of fat in the ice cream would be the most effective way of reducing the calorific value as it has a calorific value per gram which is higher than that of carbohydrates. However, by reducing the amount of fat in the ice cream, considerable difficulties arise as its effectiveness in stabilising the structure is reduced. Insufficiently stable products are not robust to the cold chain and are unacceptable to consumers.

There are three phases that contribute to structure and therefore stability of ice cream, namely fat, ice and the matrix, which includes stabilisers.

In low fat ice cream where the structuring contribution of fat has been decreased, to maintain or improve product stability the contribution of either or both the ice and matrix phases must be increased. However, while increasing the ice content or stabiliser level may improve product stability this has undesirable effects on the texture of the ice cream. For example if the ice content is too high the ice cream will be hard and icy, whereas if the stabiliser level is too high the ice cream will have a gummy, gel-like texture as well as off flavours associated with the stabilisers.

In our co-pending application PCT/EP2005/010579, we have used ice structuring proteins (ISPs) to significantly improve the stability of low fat frozen confectionery products without the deleterious effects on texture and/or taste seen with previous approaches. However, our further investigations have shown that in low fat systems with standard levels of stabilisers and emulsifiers that the addition of ISP has an adverse effect on the structure of the gas phase, giving rise to irregular shaped gas cells and ice crystals are observed growing into the gas cells. This has an adverse effect on product texture, such as smoothness.

SUMMARY OF THE INVENTION

We have now found that the addition of polyol esters of fatty acids, such as propylene glycol monostearate, to ISP-containing low fat frozen confectionery products significantly reduces the deleterious effect of ISP on the structure of the gas phase and the resulting texture whilst retaining the beneficial effects of ISP on product stability. By contrast, the use of polyol esters of fatty acids alone does not achieve product stability in these low fat products. Thus the use of a combination of ice structuring protein (ISP) and a polyol ester of a fatty acid in a low fat frozen confectionery product results in a significant improvement in the stability of the product, due to the presence of the ISP, but without the deleterious effect on texture.

Accordingly, the present invention provides a low fat frozen confectionery product having 5 wt % or less fat which product comprises an ice structuring protein (ISP) and a polyol ester of a fatty acid. Preferably the product has 3 wt % or less fat.

Preferably the product comprises at least 0.0005 wt % ISP, more preferably at least 0.001 wt % ISP.

Preferably the product comprises at least 0.1 wt % of polyol esters of fatty acids. Preferably the product comprises 1 wt % or less of polyol esters of fatty acids, more preferably 0.5 wt % or less.

Preferably the polyol is propylene glycol. Preferably the polyol ester of a fatty acid is propylene glycol monostearate (PGMS).

In one embodiment, the product comprises at least 0.5 wt % stabilisers. In another embodiment the product comprises less than 0.5 wt % stabilisers.

In one embodiment, the product has surface definition, by which we mean the product has one or more shaped non-planar surfaces, typically shaped by a moulding or extrusion process or similar.

The present invention also provides the use of a combination of an ice structuring protein (ISP) and a polyol ester of a fatty acid to stabilise the structure of a low fat frozen confectionery product having 5 wt % or less fat.

In another related aspect, the present invention provides the use of a combination of an ice structuring protein (ISP) and a polyol ester of a fatty acid to enhance the shape retention of a low fat frozen confectionery product having 5 wt % or less fat.

The present invention further provides a method of stabilising a low fat frozen confectionery product having 5 wt % or less fat which method comprises adding to the product of a combination of an ice structuring protein (ISP) and a polyol ester of a fatty acid prior to or during freezing of the product.

In another related aspect, the present invention provides a method of enhancing shape retention in a low fat frozen confectionery product having 5 wt % or less fat which method comprises adding to the product of a combination of an ice structuring protein (ISP) and a polyol ester of a fatty acid prior to, during, and/or after freezing of the product.

The present invention also provides the use of a polyol ester of a fatty acid to reduce the deleterious effect of ISP on the gas phase of a low fat frozen confectionery product having 5 wt % or less fat. In a related aspect, the present invention also provides the use of a polyol ester of a fatty acid to increase the smoothness of an ISP-containing low fat frozen confectionery product having 5 wt % or less fat.

DETAILED DESCRIPTION OF THE INVENTION

Unless defined otherwise, all technical and scientific terms used herein have the same meaning as commonly understood by one of ordinary skill in the art (e.g. in frozen confectionery manufacture, molecular biology and biochemistry). Definitions and descriptions of various terms and techniques used in frozen confectionery manufacture are found in Ice Cream, 4$^{th}$ Edition, Arbuckle (1986), Van Nostrand Reinhold Company, New York, N.Y. Standard techniques are used for molecular and biochemical methods (see generally, Sambrook et al., Molecular Cloning: A Laboratory Manual, 3$^{rd}$ ed. (2001) Cold Spring Harbor Laboratory Press, Cold Spring Harbor, N.Y. and Ausubel et al., Short Protocols in Molecular Biology (1999) 4$^{th}$ Ed, John Wiley & Sons, Inc.—and the full version entitled Current Protocols in Molecular Biology).

Ice Structuring Proteins

Ice structuring proteins (ISPs) are proteins that can influence the shape and size of the crystals of ice formed when freezing does occur, and inhibit recrystallisation of ice (Clarke et al., 2002, Cryoletters 23: 89-92). Many of these proteins were identified originally in organisms that live in sub-zero environments and are thought to protect the organism from the deleterious effects of the formation of ice crystals in the cells of the organism. For this reason many ice structuring proteins are also known as antifreeze proteins (AFPs). In the context of the present invention, an ISP is defined as a protein that has ice recrystallisation inhibitory (RI) activity.

Ice recrystallisation inhibitory activity properties can conveniently be measured by means of a modified splat assay as described in WO00/53029:

2.5 µl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD video camera.

Ice crystal sizing can be performed by hand-drawing around the ice-crystals. Typically, at least 100 to 400 crystals are sized for each sample. The ice crystal size is taken as being the longest dimension of the 2D projection of each crystal. The average crystal size is determined as the number average of the individual crystal sizes. The size of the ice-crystals in both assays is compared. If the size at 30-60 minutes is similar or only moderately (less than 10%) increased compared to the size at t=0, and/or the crystal size is less than 20 micrometer, preferably from 5 to 15 micrometer this is an indication of good ice-crystal recrystallisation properties.

Significant ice recrystallisation inhibitory activity can be defined as where a 0.01 wt % solution of the ISP in 30 wt % sucrose, cooled rapidly (at least Δ50° C. per minute) to −40° C., heated rapidly (at least Δ50° C. per minute) to −6° C. and then held at this temperature results in an increase in average ice crystal size over one hour of less than 5 µm.

Types of ISPs

ISPs for use according to the present invention can be derived from any source provided they are suitable for inclusion in food products. ISPs have been identified to date in fish, plants, lichen, fungi, micro-organisms and insects. In addition, a number of synthetic ISPs have been described.

Examples of fish ISP materials are AFGP (for example obtainable from Atlantic cod, Greenland cod and Tomcod), Type I ISP (for example obtainable from Winter flounder, Yellowtail flounder, Shorthorn sculpin and Grubby sculpin), Type II ISP (for example obtainable from Sea raven, Smelt and Atlantic herring) and Type III ISP (for example obtainable from Ocean pout, Atlantic wolffish, Radiated shanny, Rock gunnel and Laval's eelpout).

Type III ISPs are particularly preferred. Type III ISPs typically have a molecular weight of from about 6.5 to about 14 kDa, a beta sandwich secondary structure and a globular tertiary structure. A number of genes encoding type III ISPs have been cloned (Davies and Hew, 1990, FASEB J. 4: 2460-2468). A particularly preferred type III ISP is type III HPLC-12 (Accession No. P19614 in the Swiss-Prot protein database).

Lichen AFPs are described in WO99/37673 and WO01/83534.

Examples of plants in which ISPs have been obtained are described in WO98/04699 and WO98/4148 and include garlic-mustard, blue wood aster, spring oat, winter cress, winter canola, Brussels sprout, carrot (GenBank Accession No. CAB69453), Dutchman's breeches, spurge, daylily, winter barley, Virginia waterleaf, narrow-leaved plantain, plantain, speargrass, Kentucky bluegrass, Eastern cottonwood, white oak, winter rye (Sidebottom et al., 2000, Nature 406: 256), bittersweet nightshade, potato, chickweed, dandelion, spring and winter wheat, triticale, periwinkle, violet and grass.

The ISPs can be obtained by extraction from native sources by any suitable process, for example the isolation processes as described in WO98/04699 and WO98/4148.

Alternatively, ISPs can be obtained by the use of recombinant technology. For example host cells, typically micro-organisms or plant cells, may be modified to express ISPs and the ISPs may then be isolated and used in accordance with the present invention. Techniques for introducing nucleic acid constructs encoding ISPs into host cells are well known in the art.

Typically, an appropriate host cell or organism would be transformed by a nucleic acid construct that encodes the desired ISP. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species include yeasts such as (but not limited to) those of the genera *Saccharomyces, Kluyveromyces, Pichia, Hansenula, Candida, Schizo saccharomyces* and the like, and filamentous fungal species such as (but not limited to) those of the genera *Aspergillus, Trichoderma, Mucor, Neurospora, Fusarium* and the like. Preferably the species selected is a yeast, most preferably a species of *Saccharomyces* such as *S. cerevisiae*. Where glycosylation of the ISP leads to reduced activity then it is preferred that the host exhibits reduced glycosylation of heterologous proteins.

A wide variety of plants and plant cell systems can also be transformed with the nucleic acid constructs of the desired polypeptides. Examples of plant species include maize, tomato, tobacco, carrots, strawberries, rape seed and sugar beet.

The sequences encoding the ISPs are preferably at least 80% identical at the amino acid level to an ISP identified in nature, more preferably at least 95% or 100% identical. However, persons skilled in the art may make conservative substitutions or other amino acid changes that do not reduce the RI activity of the ISP. For the purpose of the invention these ISPs possessing this high level of identity to an ISP that naturally occurs are also embraced within the term "ISPs".

Polyol Esters of Fatty Acids

Polyol esters of fatty acids are typically food grade.

Examples of polyol moieties include aliphatic polyols, such as alkane diols, for example, a C2 to C8 alkane diol, more preferably a C2 to C5 alkane diol. Particular examples of alkane diols include ethylene glycol, propylene glycol and butylene glycol. Preferably the polyol is propylene glycol.

Other polyols include polycarboxylic acids, such as oxalic acid, succinic acid, and glutaric acid.

In another embodiment, an aliphatic carboxylic acid, such as acetic acid, is used in place of, or in combination with a polyol. Thus the present invention also relates to a combination of aliphatic carboxylic acid esters of fatty acids and ISP.

The fatty acid esters can be saturated or unsaturated. Preferred fatty acid esters are aliphatic C12 to C22 fatty acid esters. Preferred examples include stearate, laurate and palmitate, including both monoester and diester forms thereof.

Mixtures of different polyol esters of fatty acids can be used, such as a mixture of PGMS and propylene glycol palmitate.

The total polyol ester of a fatty acid content of the product is typically from 0.1 wt % to 1 wt %. The product preferably comprises at least 0.1 wt % polyol esters of fatty acids and preferably less than 0.5 wt % polyol esters of fatty acids, more preferably 0.3 wt % or less.

Low Fat Frozen Confectionery Products

Low fat frozen confectionery products of the invention are typically frozen dairy confections. Frozen dairy confections are confections that typically contain milk or milk solids, such as ice cream, milk ice, frozen yoghurt and sherbet. The term "milk" includes milk-substitutes such as soya milk, although mammalian milk is preferred. Preferably the frozen confection is an ice cream or milk ice.

The low fat product of the invention contains 5 wt % or less fat, preferably 4 wt % or less fat, more preferably 3 wt % or less, such as 2 wt % or less, or 1 wt % or less. In one embodiment, the product is fat-free, which means that the product contains substantially no fat (i.e. less than 0.5 wt %). In another embodiment, the product has at least 0.5 wt % fat. Where the product is coated with a non-dairy composition such as a chocolate or couverture layer, the determination of fat content for the product should disregard the coating.

Frozen confections of the invention, such as dairy confections, preferably contain at least about 3 wt % milk solid non-fat (MSNF), more preferably from about 5 wt % to about 25 wt % MSNF. Milk ices and ice cream will generally comprise about 10 or 11 wt % MSNF.

Stabilisers may be present in the frozen products of the invention although it should be noted that the stabilising effects of the ISP can allow for stabiliser replacement in some cases. However, significant levels of stabilisers may still be required, in addition to ISP, in some product formulations, such as very low fat products with less than 1 wt % fat, to produce the desired product stability. Nonetheless, the resulting products are improved over previous products because the ISP reduces or ameliorates the deleterious effects of the stabilisers on texture and taste.

Suitable stabilisers include alginates, gelatin, gum acacia, guar gum, gum karaya. locust bean gum, carageenan and salts thereof, xanthan gum, microcrystalline cellulose, cellulose ethers or mixtures thereof. The amount of stabiliser is preferably 1.5% or less by weight, more preferably 1% or less by weight such as from 0.1 to 0.8 wt %.

In one embodiment, the product comprises at least 0.5 wt % stabilisers, such as at least 0.7 wt % stabilisers. Preferably the level of fat in such a product is less than 2 or 1 wt %. In another embodiment the product comprises less than 0.5 wt % stabilisers. Preferably the level of fat in such a product is at least 1 wt %, more preferably at least 2 wt %.

Frozen confections of the invention typically comprise at least about 0.0001 wt % ISP, more preferably at least 0.0005 wt %, most preferably at least 0.001 wt %. ISPs can be used at very low concentrations and therefore preferably the confections comprise less than 0.05 wt % ISP. A preferred range is from about 0.001 to 0.01 wt %. ISPs can be used individually or in combination.

The frozen confections may be aerated or unaerated, preferably aerated. By unaerated is meant a frozen confection having an overrun of less then 20%, preferably less than 10%. An unaerated frozen confection is not subjected to deliberate steps such as whipping to increase the gas content. Nonetheless, it will be appreciated that during the preparation of unaerated frozen confections, low levels of gas, such as air, may be incorporated in the product. The amount of overrun present in an aerated product will vary depending on the desired product characteristics. For example, the level of overrun in ice cream is typically from about 70 to 100%, and in confectionery such as mousses the overrun can be as high as 200 to 250 wt %, whereas the overrun in milk ices is from 25 to 30%. Aerated frozen confections preferably have an overrun of from 30% to 200%, more preferably from 50% to 150%.

Frozen confections of the invention can be manufactured using a variety of techniques known in the art. Products are typically frozen quiescently or using agitation, such as in a surface-scraped heat exchanger. Products may be moulded. Products may contain complex shapes and have a high degree of surface definition since the addition of ISP preserves the stability of such shapes and structures.

ISPs and polyol esters of fatty acids can be added prior to, during or after freezing of the product. If added after freezing, this will take place whilst the product is still plastic so that the ISP can be mixed e.g. after extrusion from a surface-scraped heat exchanger and prior to hardening.

Ice cream products and the like can be subjected to an optional cold hardening step of below from −20° C. to −25° C.

The present invention also encompasses compositions for producing a low fat frozen confectionery product of the invention, which composition comprises ISP and a polyol ester of a fatty acid. The preferred levels of ISP and polyesters of fatty acids are as described above. Compositions include liquid premixes and dry mixes, for example powders, to which an aqueous liquid, such as milk or water, is added.

The present invention will now be further described with reference to the following examples, which are illustrative only and non-limiting.

EXAMPLES

Example 1

A study was conducted to investigate the effect on the stability of the air phase in ice cream of the addition of polyol ester of a fatty acid to low fat ice cream containing ISP. Also the effect on product stability and texture was considered.

Materials and Methods

Formulations

A typical 0.5% butter fat formulation was considered. The formulation for the ice cream is given below.

|  | (wt %) |
| --- | --- |
| Sucrose | 12.0 |
| Skimmed Milk Powder | 12.0 |
| Polydextrose | 5.25 |
| Corn Syrup MD40 | 5.0 |
| Maltodextrin 10DE | 4.0 |
| Butter Fat | 0.5 |
| Locust Bean Gum | 0.1 |
| Guar | 0.1 |
| Emulsifier | 0.15 |
| Flavour | 0.473 |
| Water | 60.427 |

The ISP used was recombinant type III HPLC-12 from ocean pout (see WO97/02343 and Accession No. P19614 in the Swiss-Prot protein database).

The formulation above was modified by the addition of PGMS, ISP and both PGMS and ISP. When the formulation was modified PGMS and ISP were added at 0.3 wt % and 0.004 wt % respectively.

Processing

All ice creams made on standard MF75 freezer, aerated to 100% overrun, extruded at ~−7° C. and collected in 500 ml blocks that were blast frozen and then stored at −25° C. before being tested or tasted.

Testing

Scanning Electron Microscopy (SEM)

The microstructure of each products was visualised using Low Temperature Scanning Electron Microscopy (LTSEM). The sample was cooled to −80° C. on dry ice and a sample section cut. This section, approximately 5 mm×5 mm×10 mm in size, was mounted on a sample holder using a Tissue Tek: OCT™ compound (PVA 11%, Carbowax 5% and 85% non-reactive components). The sample including the holder was plunged into liquid nitrogen slush and transferred to a low temperature preparation chamber: Oxford Instrument CT1500HF. The chamber is under vacuum, approximately $10^{-4}$ bar, and the sample is warmed up to −90° C. Ice is slowly etched to reveal surface details not caused by the ice itself, so water is removed at this temperature under constant vacuum for 60 to 90 seconds. Once etched, the sample is cooled to −110° C. ending up the sublimation, and coated with gold using argon plasma. This process also takes place under vacuum with an applied pressure of $10^{-1}$ millibars and current of 6 milliamps for 45 seconds. The sample is then transferred to a conventional Scanning Electron Microscope (JSM 5600), fitted with an Oxford Instruments cold stage at a temperature of −160° C. The sample is examined and areas of interest captured via digital image acquisition software.

Shape Retention

Assessment of shape retention was conducted when stick products made from the ice cream were stored at a constant temperature in a temperature controlled cabinet. Storage temperatures of −5° C. and −7° C. were considered. Photographs of the ice cream stick products were taken at regular intervals and from the photographs an assessment of changes to the shape were made by a panel. By comparing changes to the shape, products made with different additives (ISP and PGMS) could be ranked and an assessment of improvement in product stability obtained.

Sensory Properties

Evaluation of the sensory properties was carried out through informal tastings. In particular attributes related to air phase such as smoothness and rate of breakdown were considered.

Results

The microstructure, texture and shape retention of the following ice creams were considered:
1) 0.5% fat, standard stabilisers and emulsifiers (control)
2) 0.5% fat, standard stabilisers and emulsifiers and PGMS (+PGMS)
3) 0.5% fat, standard stabilisers and emulsifiers and ISP (+ISP)
4) 0.5% fat, standard stabilisers and emulsifiers and PGMS and ISP (+PGMS+ISP)

Analysis of microstructure via SEM showed for formulation 1 the standard microstructure associated with ice cream, namely round ice crystals and air cells, with a distribution of sizes. The structure of formulation 2 was similar to that of formulation 1, with the exception that the ice crystals were smaller due to the presence of PGMS. The structure of formulation 3 was different as the presence of ISP gave smaller elongated ice crystals, and the ice crystals had disrupted the air phase, leading to irregular shaped air cells, into which ice crystals had grown. The structure of formulation 4 showed that although the presence of ISP still gives smaller elongated ice crystals the presence of PGMS gives round air cells into which ice crystals had not grown.

Sensory analysis of ice cream made from formulation 4 suggested it was smoother, chewier and had a slower rate breakdown compared to formulation 3. The texture of formulation 4 was considered to be better or more desirable than that of formulation 3. The improvement in texture is related to the better gas structure present in formulation 4 compared to formulation 3.

The results of the shape retention tests demonstrate that at both storage temperatures the addition of ISP to formulation 1 improves shape retention. Also it was observed that at both storage temperatures the addition of PGMS to formulation 1 gave no improvement in shape retention. Similarly the addition of both ISP and PGMS gave no improvement in shape retention above the addition of ISP alone. The improvement obtained by adding ISP is greater at the lower storage temperature as there is a higher ice content in the ice cream at this temperature and ISP modifies the structure of the ice network in the ice cream.

This example illustrates that for low fat ice creams with a normal level of stabilisers, product stability, in terms of shape retention, can be improved by adding ISP only. However, the addition of ISP alone has an undesirable effect on the gas structure in the ice cream and as a result gives a product with a poorer texture. The addition of PGMS as well as ISP improves the gas structure and gives a product with a superior texture.

The various features and embodiments of the present invention, referred to in individual sections above apply, as appropriate, to other sections, mutatis mutandis. Consequently features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A low fat frozen confectionery product having 5 wt % or less fat which product comprises at least 0.0001 wt % of an ice structuring protein (ISP) and at least 0.1 wt % of a polyol ester of a fatty acid, said product comprising ice crystals and air cells, the ice crystals not having grown into the air cells.

2. A product according to claim 1 which has 3 wt % or less fat.

3. A product according to claim 2 which comprises at least 0.0005 wt % ISP.

4. A product according to claim 3 which comprises at least 0.001 wt % ISP.

5. A product according to claim 1 which comprises from 0.1 wt % to 0.5 wt % polyol esters of fatty acids.

6. A product according to claim 1 wherein the polyol ester of a fatty acid is propylene glycol monostearate.

7. A product according to claim 1 which has surface definition.

8. A product according to claim 1 which is a dairy confection.

9. A method of stabilizing a low fat frozen confectionery product having 5 wt % or less fat which method comprises adding to the product at least 0.001 wt % of an ice structuring protein (ISP) and at least 0.1 wt % of a polyol ester of a fatty acid prior to, during and/or after freezing of the product, said product comprising ice crystals and air cells, the ice crystals not having grown into the air cells.

10. A method of enhancing the shape retention of a low fat frozen confectionery product having 5 wt % or less fat which method comprises adding to the product at least 0.0005 wt % of an ice structuring protein (ISP) and at least 0.1 wt % of a polyol ester of a fatty acid prior to, during, and/or after freezing of the product, said product comprising ice crystals and air cells, the ice crystals not having grown into the air cells.

11. A method according to claim 9 wherein the product has 3 wt % or less fat.

12. A low fat frozen confectionery product having 5 wt % or less fat which comprises at least 0.0005 wt % of an ice structuring protein (ISP) and at least 0.1 wt % of a polyol ester of a fatty acid, wherein the product is frozen using agitation, said product comprising ice crystals and air cells, the ice crystals not having grown into the air cells.

13. A low fat frozen confectionery product having 3 wt % or less fat which product comprises at least 0.001 wt % of an ice structuring protein (ISP) and at least 0.1 wt % of a polyol ester of a fatty acid, said product comprising ice crystals and air cells, the ice crystals not having grown into the air cells.

14. The product according to claim 13 which has 0.5 wt % or less fat.

15. The product according to claim 13 which has 0.5 wt % or less butter fat.

16. The product according to claim 13 wherein the polyol ester comprises propylene glycol monostearate and the ISP is selected from the group of fish ISP, plant ISP, lichen ISP, fungi ISP, micro-organism ISP, and insect ISP.

17. The product according to claim 16 wherein the fish ISP is recombinant fish ISP.

18. A low fat frozen confectionery product having 3 wt % or less fat which product comprises at least 0.001 wt % of a recombinant ice structuring protein (ISP) from fish and at least 0.1 wt % of a polyol ester of a fatty acid which comprises propylene glycol monostearate, said product comprising ice crystals and air cells, the ice crystals not having grown into the air cells.

19. The product according to claim 18 wherein the ISP is a type III.

20. The product according to claim 19 wherein the ISP is a type III HPLC-12.

21. The product according to claim 20 which comprises from 0.1 wt % to 0.5 wt % polyol ester of fatty acid and at least 0.001 and less than 0.05 wt % ISP.

22. The product according to claim 21 which comprises at least 0.3 wt % polyol ester of fatty acid and at least 0.004 wt % ISP.

* * * * *